(12) United States Patent
Okamoto et al.

(10) Patent No.: US 9,922,745 B2
(45) Date of Patent: Mar. 20, 2018

(54) AGGREGATE OF CARBON NANOTUBES, AND PRODUCTION METHOD THEREFOR

(71) Applicant: Toray Industries, Inc., Tokyo (JP)

(72) Inventors: Naoyo Okamoto, Nagoya (JP);
Kazunori Hondo, Nagoya (JP);
Hidekazu Nishino, Nagoya (JP);
Kenichi Sato, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/650,379

(22) PCT Filed: Feb. 25, 2014

(86) PCT No.: PCT/JP2014/054483
§ 371 (c)(1),
(2) Date: Jun. 8, 2015

(87) PCT Pub. No.: WO2014/132957
PCT Pub. Date: Sep. 4, 2014

(65) Prior Publication Data
US 2015/0318069 A1 Nov. 5, 2015

(30) Foreign Application Priority Data

Feb. 28, 2013 (JP) .................. 2013-038941
Jun. 11, 2013 (JP) .................. 2013-122880
Nov. 6, 2013 (JP) .................. 2013-230071

(51) Int. Cl.
| | | |
|---|---|---|
| *H01B 1/04* | (2006.01) | |
| *C01B 31/02* | (2006.01) | |
| *B82Y 30/00* | (2011.01) | |
| *B82Y 40/00* | (2011.01) | |
| *C01B 32/16* | (2017.01) | |
| *C01B 32/174* | (2017.01) | |

(52) U.S. Cl.
CPC .............. *H01B 1/04* (2013.01); *C01B 32/16* (2017.08); *C01B 32/174* (2017.08); *B82Y 30/00* (2013.01); *B82Y 40/00* (2013.01); *C01B 2202/04* (2013.01); *C01B 2202/22* (2013.01); *C01B 2202/30* (2013.01); *C01B 2202/36* (2013.01); *Y10S 977/742* (2013.01); *Y10S 977/842* (2013.01); *Y10S 977/932* (2013.01)

(58) Field of Classification Search
CPC . H01B 1/02–1/04; B82Y 30/00; B82Y 40/00; C01B 2202/04; C01B 31/0273; C01B 32/168; C01B 32/174
USPC ......... 252/500–511; 977/742, 842, 932, 748; 423/460
See application file for complete search history.

(56) References Cited

U.S. PATENT DOCUMENTS

| | | | |
|---|---|---|---|
| 2002/0150529 A1* | 10/2002 | Dillon ................ | B82Y 30/00 423/460 |
| 2005/0163697 A1 | 7/2005 | Beguin et al. | |
| 2009/0001326 A1 | 1/2009 | Sato et al. | |
| 2009/0022652 A1 | 1/2009 | Sato et al. | |
| 2009/0142581 A1 | 6/2009 | Heintz et al. | |
| 2009/0176924 A1 | 7/2009 | Bordere et al. | |
| 2010/0301278 A1 | 12/2010 | Hirai et al. | |
| 2011/0127472 A1 | 6/2011 | Sato et al. | |
| 2012/0058889 A1 | 3/2012 | Nishino et al. | |
| 2014/0080971 A1 | 3/2014 | Saito et al. | |

FOREIGN PATENT DOCUMENTS

| | | | |
|---|---|---|---|
| EP | 2 404 873 A1 | 1/2012 | |
| JP | 2008-251273 | 10/2008 | |
| JP | 2009-12988 A | 1/2009 | |
| JP | 2009-29695 A | 2/2009 | |
| JP | 2009-517517 A | 4/2009 | |
| JP | 2009-536911 A | 10/2009 | |
| JP | 2010-024127 | 2/2010 | |
| JP | 2010-163568 | 7/2010 | |
| JP | 2010-254546 A | 11/2010 | |
| WO | 2006/065937 A2 | 6/2006 | |
| WO | 2012/053561 A1 | 4/2012 | |
| WO | WO2012053561 | * 4/2012 | .............. H01M 4/96 |
| WO | 2012/161307 | 11/2012 | |

OTHER PUBLICATIONS

Bower ("Intercalation and partial exfoliation of single-walled carbon nanotubes by nitric acid." Chem Phys Let, 288, p. 481-486, May 1998).*
Shirmardi ("Kinetics and Equilibrium Studies on Adsorption of Acid Red 18 (Azo-Dye) Using Multiwall Carbon Nanotubes (MWCNTs) from Aqueous Solution."*
Yang ("Adsorption of fulvic acid by carbon nanotubes from water." Env Pollution, 157, pp. 1095-1100, 2005).*
Blanco ("A Study of the Adsorption Properties of Single Walled Carbon Nanotubes Treated with Nitric Acid." Adsorption Science & Technology vol. 29 No. 7, pp. 705-722). (Year: 2011).*

(Continued)

*Primary Examiner* — Tri V Nguyen
(74) *Attorney, Agent, or Firm* — DLA Piper LLP (US)

(57) ABSTRACT

An aggregate of carbon nanotubes has an acid adsorption amount equal to or greater than 0.6 mass % and equal to or less than 12 mass %, which is obtained by subjecting a starting material composition containing carbon nanotubes to a two-stage wet oxidation treatment. A method of producing an aggregate of carbon nanotubes includes a primary oxidation treatment step, wherein a starting material composition containing carbon nanotubes is subjected to a wet oxidation treatment to give a primary treated aggregate of carbon nanotubes having a ratio (G/D ratio) of the height of G band to that of D band in Raman spectroscopic analysis at 532 nm wavelength equal to or greater than 30; and a secondary oxidation treatment step of performing a wet oxidation treatment under an oxidizing condition stronger than that of the primary oxidation treatment step.

16 Claims, No Drawings

(56) References Cited

OTHER PUBLICATIONS

Tchoul ("Effect of Mild Nitric Acid Oxidation on Dispersability, Size, and Structure of Single-Walled Carbon Nanotubes." Chem. Mater. 2007, 19, 5765-5772) (Year: 2007).*
Supplementary European Search Report dated Aug. 24, 2016, from corresponding Application No. 14756942.0.
Wang, Yu et al., "Controlled growth of single-walled carbon nanotubes at atmospheric pressure by catalytic decomposition of ethanol and an efficient purification method," *Journal of Materials Chemistry*, Nov. 13, 2006, vol. 17, No. 4, pp. 357-363.
Brozena, Alexandra H. et al., "Outer Wall Selectively Oxidized, Water-Soluble Double-Walled Carbon Nanotubes," *Journal of American Chemical Society*, Mar. 24, 2010, vol. 132, pp. 3932-3938.
Shulitskii, B.G. et al., "Effect of the Multistage Chemical Treatment of Carbon Nanotubes on Their Purity and Quality of Walls," *Russian Journal of Physical Chemistry A*, Aug. 12, 2012, vol. 86, No. 10, pp. 1595-1601.

* cited by examiner

AGGREGATE OF CARBON NANOTUBES, AND PRODUCTION METHOD THEREFOR

TECHNICAL FIELD

This disclosure relates to an aggregate of carbon nanotubes and a method of producing the same.

BACKGROUND

A carbon nanotube is a substance having a structure in which a graphite sheet composed of a hexagonal mesh-shaped arrangement of carbon atoms is cylindrically wound, and a carbon nanotube of which the graphite sheet is wound into a single layer is called a single-walled carbon nanotube, and that of which the graphite sheet is wound into multiple layers is called a multi-walled carbon nanotube. Among the multi-walled carbon nanotubes, in particular, a carbon nanotube of which the graphite sheet is wound into two layers is called a double-walled carbon nanotube.

Known methods of producing carbon nanotubes include synthesis methods by a laser ablation method, a chemical vapor deposition method (a CVD method) and the like. Among the above, the CVD method is a synthesis method capable of controlling reaction conditions such as the type of the carbon starting material, supply rate of the starting material, synthesis temperature, and density of the catalyst, and is capable of synthesizing carbon nanotubes in a large scale relatively easily. Recently, it is becoming possible to selectively synthesize a carbon nanotube having desired diameter, length and number of layers, and it is known that a chemical vapor deposition method is capable of producing a carbon nanotube by controlling the number of layers of carbon nanotubes to a single layer or two to five layers.

Carbon nanotubes are expected to be used as electrically conductive materials because they themselves have excellent electrical conductivity. It is known that, normally, among carbon nanotubes, those having a small number of layers such as a single-walled carbon nanotube and a double-walled carbon nanotube have especially excellent properties such as electrical conductivity because they have a high rate of the graphite structure.

Carbon nanotubes have been used for a transparent conductive film and the like by taking advantage of these properties. In addition, the transparent conductive film can be suitably used as a substrate having a transparent electrically conductive film such as a touch panel, a liquid crystal display, organic electroluminescence, and electronic paper. In these uses, a transparent conductive film having higher electrical conductivity is required, and an aggregate of carbon nanotubes capable of exhibiting excellent electrical conductivity when used to configure a transparent conductive film is desired.

To obtain an aggregate of carbon nanotubes capable of exhibiting excellent electrical conductivity when used to configure a transparent conductive film, methods of removing carbon impurities other than carbon nanotubes contained as impurities in a composition containing carbon nanotubes produced by a CVD method such as amorphous carbon and particulate carbon, have been known. As a method of removing carbon impurities other than carbon nanotubes, a heating method in a gaseous phase is generally used. However, when a composition containing carbon nanotubes is heated in a gaseous phase, not only carbon impurities are removed, but also defects occur in the outer layer of a multi-walled carbon nanotube at the same time. Accordingly, a technique of removing the outer layer having defects by performing a liquid phase oxidation treatment on a composition containing carbon nanotubes which has been subjected to vapor phase oxidation (Japanese Patent Laid-open Publication No. 2009-012988) has been known, but the electrical conductivity of the resulting aggregate of carbon nanotubes is insufficient. In addition, when the liquid phase oxidation treatment is performed, use of a stronger acid tends to make removal of carbon impurities easier, but use of a strong acid tends to damage carbon nanotubes, which results in impaired properties of the carbon nanotubes. Therefore, it is practically required to use an acid with relatively mild reactivity as an acid to remove carbon impurities.

Further, except for removal of carbon impurities, as a method of improving electrical conductivity of an aggregate of carbon nanotubes, a method of adding a dopant has been proposed. So far, various compounds have been studied as dopants, and an example of adding thionyl chloride as a dopant has been reported, but sufficient electrical conductivity has not been achieved and, further, thionyl chloride has a problem with regard to stability as a dopant (Japanese Patent Laid-open Publication No. 2009-536911).

As methods of improving electrical conductivity other than those described above, a method of separating metallic carbon nanotubes having excellent electrical conductivity from semiconductive carbon nanotubes by electrophoresis, a synthesis method which employs metallic nanotubes as a main component in a synthesis stage and the like have been proposed, but these methods are poor in reproducibility because their operations are very complex and, therefore, they have not been put to practical use.

It could therefore be helpful to provide an aggregate of carbon nanotubes capable of exhibiting excellent electrical conductivity when used to configure a transparent conductive film, and a production method therefor.

SUMMARY

We found that an aggregate of carbon nanotubes capable of exhibiting excellent electrical conductivity when used to configure a transparent conductive film can be obtained by subjecting a composition containing carbon nanotubes to a two-stage wet oxidation treatment to give an aggregate of carbon nanotubes having an acid adsorption amount equal to or greater than 0.6 mass % and equal to or less than 12 mass %.

We thus provide:

1. An aggregate of carbon nanotubes, which has an acid adsorption amount equal to or greater than 0.6 mass % and equal to or less than 12 mass %.

2. The aggregate of carbon nanotubes according to the above item 1, wherein the acid adsorbed is at least one kind of acid selected from the group consisting of nitric acid, sulfuric acid, hydrochloric acid and phosphoric acid.

3. The aggregate of carbon nanotubes according to the above item 1 or 2, wherein the ratio (G/D ratio) of the height of G band to that of D band in Raman spectroscopic analysis at 532 nm wavelength of the aggregate of carbon nanotubes is equal to or greater than 30.

4. The aggregate of carbon nanotubes according to any one of the above items 1 to 3, wherein the ratio of the content of double-walled carbon nanotubes to the total content of carbon nanotubes in the aggregate of carbon nanotubes is equal to or greater than 50%.

5. The aggregate of carbon nanotubes according to any one of the above items 1 to 4, wherein the mean outside diameter of carbon nanotubes contained in the aggregate of carbon nanotubes is equal to or greater than 1 nm and equal to or less than 3 nm.

6. A dispersion liquid containing: the aggregate of carbon nanotubes according to any one of the above items 1 to 5 and a dispersion medium.

7. A transparent conductive film, including a substrate, and an electrically conductive layer including the aggregate of carbon nanotubes according to any one of the above items 1 to 5 formed on the substrate.

8. The transparent conductive film according to the above item 7, which has a total light transmittance equal to or greater than 90% and a surface resistance equal to or less than 1000 Ω/□.

9. A method of producing an aggregate of carbon nanotubes, the method including:

a primary oxidation treatment step, wherein a starting material composition containing carbon nanotubes is subjected to a wet oxidation treatment to give a primary treated aggregate of carbon nanotubes having a ratio (G/D ratio) of the height of G band to that of D band in Raman spectroscopic analysis at 532 nm wavelength equal to or greater than 30; and a secondary oxidation treatment step of performing a wet oxidation treatment under an oxidizing condition stronger than that of the primary oxidation treatment step.

10. The method of producing the aggregate of carbon nanotubes according to the above item 9, wherein the ratio (G/D ratio) of the height of G band to that of D band in Raman spectroscopic analysis at 532 nm wavelength of the aggregate of carbon nanotubes after the secondary oxidation treatment step is equal to or greater than 30.

11. The method of producing the aggregate of carbon nanotubes according to the above item 9 or 10, wherein the ratio of the content of double-walled carbon nanotubes to the total content of carbon nanotubes contained in the aggregate of carbon nanotubes after the secondary oxidation treatment step is equal to or greater than 50%.

12. The method of producing the aggregate of carbon nanotubes according to any one of the above items 9 to 11, wherein the mean outside diameter of carbon nanotubes contained in the aggregate of carbon nanotubes after the secondary oxidation treatment step is equal to or greater than 1 nm and equal to or less than 3 nm.

13. The method of producing the aggregate of carbon nanotubes according to any one of the above items 9 to 12, wherein the primary oxidation treatment step is a heat treatment step in nitric acid.

14. The method of producing the aggregate of carbon nanotubes according to the above item 13, wherein the secondary oxidation treatment step is a treatment step which uses a higher concentration of nitric acid than the concentration of nitric acid used in the primary oxidation treatment step.

By using the aggregate of carbon nanotubes, it is possible to obtain a transparent conductive film having excellent electrical conductivity and excellent transmittance.

DETAILED DESCRIPTION

The aggregate of carbon nanotubes has an acid adsorption amount equal to or greater than 0.6 mass % and equal to or less than 12 mass %.

An aggregate of carbon nanotubes means the whole in which multiple carbon nanotubes are present. The existence form of multiple carbon nanotubes is not particularly limited, and each of carbon nanotubes may be present independently, or may be present in a bundle form, in a form in which carbon nanotubes are tangled with each other and the like, or in the mixed form thereof. In addition, carbon nanotubes with various numbers of layers and with various diameters may be included in the aggregate. Further, even when carbon nanotubes are contained in a composition containing a dispersion liquid and other ingredients, or where carbon nanotubes are contained in a composite such as a transparent conductive film in which carbon nanotubes are composited with other ingredients, it is recognized that an aggregate of carbon nanotubes is included with regard to these multiple carbon nanotubes as long as multiple carbon nanotubes are included. Furthermore, an aggregate of carbon nanotubes may contain impurities (for example, catalysts, amorphous carbon, and particulate carbon) derived from a production process of carbon nanotubes.

The acid adsorption amount in the aggregate of carbon nanotubes is an amount of an acid component adsorbed to carbon nanotubes contained in the aggregate of carbon nanotubes represented by the mass fraction of the acid component to the total amount of the aggregate of carbon nanotubes. In this regard, the phrase that "an acid is adsorbed" represents a state in which an acid component is physically or electrostatically interacting with carbon nanotubes inside the carbon nanotubes or among the carbon nanotube bundles in the form of molecules or in the form of ions, and the phrase does not mean a state in which an acid component merely coexists in the aggregate of carbon nanotubes. By way of example, when the aggregate of carbon nanotubes is impregnated with a solution of hydrochloric acid, the amount of hydrochloric acid held in the aggregate of carbon nanotubes increases transiently, but such a state is not considered to be adsorption of an acid in the sense of our nanotubes and methods. When an acid component remains in the aggregate of carbon nanotubes even after the aggregate of carbon nanotubes is washed with water sufficiently, the acid component is considered to be adsorbed to carbon nanotubes.

Specifically, the acid adsorption amount in the aggregate of carbon nanotubes is determined as follows. First, the aggregate of carbon nanotubes of interest is suspended in ion exchanged water, and the suspension is repeatedly subjected to water washing and suction filtration until the pH of the suspension becomes neutral, and the acid component which has not been adsorbed is removed. Thereafter, the aggregate of carbon nanotubes which has been washed with water is subjected to ultrasonic irradiation in ion exchanged water so that the acid component which has been adsorbed to carbon nanotubes is released into water. The hydrogen ion concentration in the suspension is calculated from the pH of the suspension after being subjected to the ultrasonic irradiation, and from the thus calculated hydrogen ion concentration, the amount of the acid component contained in the aggregate of carbon nanotubes is calculated.

The acid adsorption amount in the aggregate of carbon nanotubes is equal to or greater than 0.6 mass % and equal to or less than 12 mass %. By setting the acid adsorption amount in the aggregate of carbon nanotubes equal to or greater than 0.6 mass %, a doping effect on the carbon nanotubes by the acid component is sufficiently exhibited, and an effect such as improvement of electrical conductivity is exhibited. The lower limit of the acid adsorption amount is preferably equal to or greater than 1 mass % because the doping effect on the carbon nanotubes by the acid component is sufficiently exhibited, and the effect such as further improvement of electrical conductivity is exhibited. In addition, by setting the acid adsorption amount in the aggregate of carbon nanotubes equal to or less than 12 mass %, a decrease in electrical conductivity can be prevented. The reason why the electrical conductivity is decreased when the acid adsorption amount in the aggregate of carbon nanotubes exceeds 12 mass % is unknown, but it can be thought that carbon nanotubes are damaged and the decrease in electrical conductivity, which surpasses the increase in electrical conductivity obtained by the doping effect, occurs when an oxidation treatment in a solution of an acid component is performed until the acid adsorption amount in the aggregate of carbon nanotubes exceeds 12 mass %. The upper limit of the acid adsorption amount is preferably equal to or less than 6 mass % and is particularly preferably equal to or less than 3 mass % because an effect such as further improvement of electrical conductivity is exhibited by suppressing the damage on the carbon nanotubes due to the heat treatment in the solution of the acid component.

With regard to the aggregate of carbon nanotubes, preferable examples of the acid component adsorbed to the carbon nanotubes include inorganic acids such as nitric acid, sulfuric acid, hydrochloric acid, and phosphoric acid. In addition, a mixture of two or more kinds of acid components may be used. From the viewpoint of simplification of operations, the acid component is preferably one kind selected from nitric acid, sulfuric acid, hydrochloric acid and phosphoric acid, or is preferably a mixture of two or more kinds of them. Further, nitric acid is particularly preferable because nitric acid has an additional effect such as being capable of efficiently removing carbon impurities such as a catalytic metal remaining after synthesis of the carbon nanotubes.

A carbon nanotube has a shape in which a single graphite sheet is cylindrically wound, and a carbon nanotube of which the graphite sheet is wound into a single layer is called a single-walled carbon nanotube, and that of which the graphite sheet is wound into multiple layers is called a multi-walled carbon nanotube, and among the multi-walled carbon nanotubes, a carbon nanotube of which the graphite sheet is wound into two layers is especially called a double-walled carbon nanotube. The shape of carbon nanotubes can be examined by a high-resolution transmission electron microscope. Preferably, the layers of graphite can be observed straight and clearly with a transmission electron microscope, but the layers of graphite may be disordered.

Normally, the fewer the number of layers of the carbon nanotubes is, the higher the degree of graphitization is, and thereby the higher the electrical conductivity of carbon nanotubes tends to be. In other words, a single-walled carbon nanotube and a double-walled carbon nanotube tend to have higher electrical conductivity than a multi-walled carbon nanotube and, therefore, they are preferable to exhibit the desired effects. In addition, a double-walled carbon nanotube has higher durability than a single-walled carbon nanotube. Accordingly, considering the fact that carbon nanotubes are subjected to an oxidation treatment and the like which may cause damages on the carbon nanotubes in the production process, it is more preferable that the content of double-walled carbon nanotubes is higher.

The ratio of the content of double-walled carbon nanotubes to the total content of carbon nanotubes contained in the aggregate of carbon nanotubes is preferably equal to or greater than 50%, and is more preferably equal to or greater than 60%, and is even more preferably equal to or greater than 70%. The ratio of the carbon nanotubes herein can be confirmed by observing an aggregate of carbon nanotubes with a transmission electron microscope and counting the number of layers of carbon nanotubes and the number of carbon nanotubes contained in the aggregate which are randomly extracted.

The specific method of counting the number of layers of carbon nanotubes and the number of carbon nanotubes is as follows. More specifically, 1 mg of an aggregate of carbon nanotubes is added into 1 mL of ethanol, and the mixture is subjected to a dispersion treatment for 15 minutes by using an ultrasonic bath. A few drops of the dispersed sample are added onto a grid and dried. The thus obtained grid onto which the sample is applied is subjected to a measurement by using a transmission electron microscope at a magnification of 400,000 times and the aggregate of carbon nanotubes is observed. The number of layers of randomly extracted 100 carbon nanotubes is evaluated. When 100 carbon nanotubes cannot be subjected to the measurement in a single field, the number of layers of carbon nanotubes is measured from multiple fields until the observed number of carbon nanotubes becomes 100. At this time, one carbon nanotube refers to a carbon nanotube of which at least one part is observed in a field, and it is not necessary that both ends of a carbon nanotube are observed. In addition, in some cases, a carbon nanotube may be recognized as two carbon nanotubes in one field, but the two carbon nanotubes are joined together outside the field and, in such a case, the number of carbon nanotubes is counted as two.

The mean outside diameter of the carbon nanotubes is preferably equal to or greater than 1 nm and equal to or less than 3 nm. With regard to an aggregate of carbon nanotubes of which the mean outside diameter of carbon nanotubes contained in the aggregate of carbon nanotubes is within the above-described range, linearity of the electron movement in the axial direction within carbon nanotubes increases, and electrical conductivity of the carbon nanotubes improves. The mean outside diameter per one carbon nanotube is an arithmetic mean value of the outside diameters of carbon nanotubes measured by observing 100 carbon nanotubes randomly extracted from a 75-nm square field where the area of carbon nanotubes accounts for equal to or greater than 10% in the total area of the field when observed by a method similar to the above-described method by using a transmission electron microscope at a magnification of 400,000 times.

The ratio (G/D ratio) of the height of G band to that of D band in Raman spectroscopic analysis at 532 nm wavelength of the aggregate of carbon nanotubes is preferably equal to or greater than 30. The G/D ratio is more preferably equal to or greater than 40 and equal to or less than 200, and the G/D ratio is especially preferably equal to or greater than 50 and equal to or less than 150. The laser wavelength used in Raman spectroscopic analysis is 532 nm. In the Raman spectrum obtained by Raman spectroscopic analysis, a Raman shift found around 1,590 $cm^{-1}$ is called the G band which is derived from graphite, and a Raman shift found around 1,350 $cm^{-1}$ is called the D band which is derived from amorphous carbon, defects in graphite and the like. Carbon nanotubes which have a higher ratio of the height of the G band to the height of the D band, i.e., the G/D ratio, have a higher degree of graphitization, which indicates that the carbon nanotubes are of high quality. In other words, the carbon nanotubes are highly crystalline and have high electrical conductivity. In Raman spectroscopic analysis on a solid such as an aggregate of carbon nanotubes, there may be a variation depending on sampling. Accordingly, at least three different positions are subjected to the Raman spectroscopic analysis, and the arithmetic mean thereof is calculated.

By forming an electrically conductive layer including the aggregate of carbon nanotubes on a substrate, a transparent conductive film can be obtained. When the transparent conductive film is produced, the aggregate of carbon nanotubes is dispersed, optionally together with additives such as a surfactant and various polymeric materials, in a dispersion medium to give a dispersion liquid. The thus obtained dispersion liquid is applied to a substrate to form the electrically conductive layer. By forming the electrically conductive layer including the aggregate of carbon nanotubes on the substrate, a transparent conductive film, of which the total light transmittance is equal to or greater than 90% and of which the surface resistance is equal to or less than 1000Ω/□, can be produced.

The above-described composition containing carbon nanotubes can be obtained by subjecting a composition containing carbon nanotubes which is a starting material (hereinafter referred to as a starting material composition containing carbon nanotubes) to a two-stage wet oxidation treatment. In other words, the method of producing the composition containing carbon nanotubes includes: a primary oxidation treatment step, wherein a starting material composition containing carbon nanotubes is subjected to a wet oxidation treatment to give a primary treated aggregate of carbon nanotubes having a ratio (G/D ratio) of the height of G band to that of D band in Raman spectroscopic analysis at 532 nm wavelength equal to or greater than 30 and having a content of double-walled carbon nanotubes equal to or greater than 50%; and a secondary oxidation treatment step of performing a wet oxidation treatment on the primary treated aggregate of carbon nanotubes, the secondary oxidation treatment being performed under an oxidizing condition stronger than that of the primary oxidation treatment step. The starting material composition containing carbon nanotubes subjected to our production method is, for example, produced as follows.

A powdery catalyst composed of iron supported on magnesia is placed on a vertical reactor such that the catalyst is present on the whole plane of a cross section of the reactor in the horizontal direction. Methane is made to flow in a vertical direction in the reactor such that methane and the catalyst are contacted with each other at a temperature of 500 to 1200° C. to produce a composition containing single- to five-walled carbon nanotubes. The thus produced composition containing carbon nanotubes, subjected to catalyst removal if necessary, is referred to as a starting material composition containing carbon nanotubes. This starting material composition containing carbon nanotubes is subjected to the primary oxidation treatment step.

The primary oxidation treatment step is wet oxidation in a liquid phase. The oxidation treatment in a liquid phase, compared to an oxidation treatment in a gaseous phase, causes less destruction and cleavage of the structure of graphite in the starting material composition containing carbon nanotubes, and makes treatment of the entire starting material composition containing carbon nanotubes more uniform. The aggregate of carbon nanotubes obtained by the primary oxidation treatment on the starting material composition containing carbon nanotubes is referred to as a primary treated aggregate of carbon nanotubes.

Examples of an oxidizing agent used for the primary oxidation treatment step, which is a wet oxidation treatment step, include inorganic acids such as nitric acid, sulfuric acid, hydrochloric acid and phosphoric acid, as well as compounds which exhibit acidic property when formed into an aqueous solution such as hydrogen peroxide, and only one kind of them or a mixture of two or more kinds of them may be used. From the viewpoint of simplification of operations, preferable examples of an acid component include one kind selected from nitric acid, sulfuric acid, hydrochloric acid, phosphoric acid and hydrogen peroxide, and a mixture of two or more kinds of them, and more preferable examples of the acid component include nitric acid, sulfuric acid, hydrogen peroxide and a mixture of two or more kinds of them. The acid component is especially preferably nitric acid. This is because although nitric acid can remove carbon impurities and carbon nanotubes having defects by oxidation, the oxidizing power of nitric acid is not so strong as to introduce a defect on a surface of a highly crystalline carbon nanotube.

When nitric acid is used as an oxidizing agent, the concentration of nitric acid is preferably equal to or greater than 50 mass % and less than 80 mass %, more preferably equal to or greater than 55 mass % and less than 70 mass %, and even more preferably equal to or greater than 60 mass % and equal to or less than 65 mass %. By making the concentration of nitric acid equal to or greater than 50 mass %, carbon impurities can be sufficiently removed, and by making the concentration of nitric acid less than 80 mass %, development of damages on the surfaces of highly crystalline carbon nanotubes can be suppressed. In the primary oxidation treatment step, when nitric acid having a concentration equal to or greater than 80 mass % is used, the difference between the rate of oxidative removal of carbon impurities and that of highly crystalline carbon nanotubes tends to be small and, therefore, highly crystalline carbon nanotubes themselves may be removed by oxidation at the same time with the oxidative removal of carbon impurities. Accordingly, such a high concentration of nitric acid is not preferable because it tends to cause a decrease in the yield of highly crystalline carbon nanotubes and a decrease in the ratio of highly crystalline carbon nanotubes, in other words, a decrease in the G/D ratio.

In addition, the primary oxidation treatment step is preferably performed under a heating condition. The temperature of the primary oxidation treatment step is preferably equal to or higher than 60° C. and equal to or lower than the boiling point, and is especially preferably in the range from 100° C. to a temperature at which a solution of an oxidizing agent is refluxed. In addition, the time of the primary oxidation treatment step is preferably equal to or longer than 1 hour and equal to or shorter than 100 hours, more preferably equal to or longer than 12 hours and equal to or shorter than 48 hours, and even more preferably equal to or longer than 18 hours and equal to or shorter than 24 hours. By making the treatment time equal to or longer than 1 hour, the carbon impurities contained in the starting material composition containing carbon nanotubes are sufficiently removed, and the ratio of highly crystalline carbon nanotubes to the total carbon nanotubes can be increased. On the other hand, by making the treatment time equal to or shorter than 100 hours, the development of damage on the surfaces of highly crystalline carbon nanotubes can be suppressed, and a decrease in electrical conductivity can be prevented.

In the primary oxidation treatment step, a primary treated aggregate of carbon nanotubes having a content of double-walled carbon nanotubes equal to or greater than 50% and having a G/D ratio equal to or greater than 30 can be obtained, by appropriately combining the type and concentration of an oxidizing agent, the heating time and the heating temperature, or combinations of these conditions when the starting material composition containing carbon nanotubes is heated in a solution of an oxidizing agent. The above-described conditions and the combinations of these conditions are not limited as long as an aggregate of carbon nanotubes having a content of the double-walled carbon nanotubes equal to or greater than 50% and having a G/D ratio equal to or greater than 30 is obtained.

By performing the primary oxidation treatment step, carbon impurities contained in the starting material composition containing carbon nanotubes and low quality carbon nanotubes having defects in the surfaces thereof, in particular, single-walled carbon nanotubes having defects in the surfaces thereof are removed by oxidation and, therefore, a primary treated aggregate of carbon nanotubes which is highly crystalline and contains double-walled carbon nanotubes at a ratio equal to or greater than 50% can be obtained. Whether an aggregate of carbon nanotubes is highly crystalline or not can be determined by the G/D ratio obtained by Raman spectroscopic analysis at 532 nm wavelength, and when the G/D ratio is equal to or greater than 30, the aggregate of carbon nanotubes can be determined as highly crystalline.

Next, the primary treated aggregate of carbon nanotubes obtained as described above is subjected to a secondary oxidation treatment step. An aggregate of carbon nanotubes obtained by subjecting the primary treated aggregate of carbon nanotubes to the secondary oxidation treatment is referred to as a secondary treated aggregate of carbon nanotubes.

The secondary oxidation treatment step is performed under an oxidizing condition stronger than that of the primary oxidation treatment step. Examples of an oxidizing agent used in the secondary oxidation treatment step include inorganic acids such as nitric acid, sulfuric acid, hydrochloric acid and phosphoric acid as well as a mixture of two or more kinds of the acids selected from the above. In the secondary oxidation treatment step, examples that make the oxidizing condition of the secondary oxidation treatment step stronger than that of the primary oxidation treatment step include, for example, the following methods. In the secondary oxidation treatment step, when an oxidizing agent of the same type as the oxidizing agent used in the primary oxidation treatment step is used, the oxidation treatment condition can be made stronger by increasing the concentration of the oxidizing agent or the treatment time. In the secondary oxidation treatment step, by employing an oxidizing agent which has an oxidizing power stronger than that of the oxidizing agent used in the primary oxidation treatment step as an oxidizing agent, the oxidation treatment condition can be made stronger. In addition, by appropriately combining the above-described means, the oxidation treatment condition can be made stronger.

When nitric acid is used in the primary oxidation treatment step, the oxidizing agent preferably used for the secondary oxidation treatment step is nitric acid having a concentration higher than that of nitric acid used in the primary oxidation treatment step. Specific examples include nitric acid having a concentration preferably equal to or greater than 70 mass % and equal to or less than 100 mass %, and is higher than the concentration of nitric acid used in the primary oxidation treatment step. More preferable examples include nitric acid having a concentration equal to or greater than 80 mass % and equal to or less than 100 mass %, and higher than the concentration of nitric acid used in the primary oxidation treatment step.

Since the secondary oxidation treatment step employs an oxidizing agent having an oxidizing power stronger than that of the oxidizing agent used in the primary oxidation treatment step, the temperature of the secondary oxidation treatment step is preferably lower than that of the primary oxidation treatment step, and is preferably equal to or higher than 20° C. and equal to or lower than 100° C., and is especially preferably equal to or higher than 40° C. and equal to or lower than 80° C. On the other hand, the oxidation treatment time of the secondary oxidation treatment step is not especially limited, but from the viewpoint of operability, the time of the secondary oxidation treatment step is preferably equal to or longer than 1 hour and equal to or shorter than 100 hours, and is especially preferably equal to or longer than 12 hours and equal to or shorter than 24 hours.

Also in the secondary oxidation treatment step, similarly to the primary oxidation treatment step, the type and concentration of an oxidizing agent, the heating time and the heating temperature, or combinations of these conditions when the aggregate of carbon nanotubes is heated in a solution of an oxidizing agent can be appropriately combined. In addition, the above-described conditions and the combinations of these conditions are not limited as long as an oxidizing condition stronger than that of the primary oxidation treatment step can be achieved.

By subjecting highly pure and highly crystalline carbon nanotubes having undergone the primary oxidation treatment step to the secondary oxidation treatment step, adsorption of the acid component occurs preferentially to the oxidation of carbon nanotubes. Accordingly, an aggregate of carbon nanotubes having an acid adsorption amount equal to or greater than 0.6 mass % and equal to or less than 12 mass % can be obtained. On the other hand, when such a two-stage wet oxidation treatment is not performed, i.e., when a wet oxidation treatment under a strong oxidizing condition as strong as that of the secondary oxidation treatment step is performed directly on a starting material composition containing carbon nanotubes, the oxidation of carbon nanotubes tends to occur preferentially to adsorption of the acid component, and carbon nanotubes tend to be degraded and, therefore, is not preferred.

The position to which the acid component is adsorbed is not clear, but we believe that the acid component is present inside the carbon nanotubes or present in the space among carbon nanotube bundles. As a result, a larger amount of the acid component can be adsorbed to carbon nanotubes while the crystallinity of the carbon nanotubes themselves is retained.

The thus obtained aggregate of carbon nanotubes after the secondary oxidation treatment step preferably has the above-described properties. In other words, it is preferable that the ratio (G/D ratio) of the height of G band to that of D band in Raman spectroscopic analysis at 532 nm wavelength is equal to or greater than 30, and it is more preferable that the G/D ratio is equal to or greater than 40 and equal to or less than 200, and it is especially preferable that the G/D ratio is equal to or greater than 50 and equal to or less than 150. In addition, the ratio of the content of double-walled carbon nanotubes to the total content of carbon nanotubes contained in the aggregate of carbon nanotubes after the secondary oxidation treatment step is preferably equal to or greater than 50%. Further, the mean outside diameter of carbon nanotubes contained in the aggregate of carbon nanotubes after the secondary oxidation treatment step is preferably equal to or greater than 1 nm and equal to or less than 3 nm.

In addition, after the primary oxidation treatment on the starting material composition containing carbon nanotubes in a liquid phase as well as the secondary oxidation treatment are performed, it is preferable that the obtained aggregate of carbon nanotubes without being dried is mixed with a dispersion medium and an additive, and dispersed in the dispersion medium, because good dispersibility of carbon nanotubes is achieved. Once carbon nanotubes are dried, the carbon nanotubes tend to form firm bundles, and tend to become difficult to disperse. Even if dried carbon nanotubes are mixed with an additive and a dispersion medium, for example, by utilizing an ultrasonic homogenizer or the like, to loosen the bundles, large energy and time are required, and the carbon nanotubes themselves tend to be damaged during the dispersing process. When carbon nanotubes are dispersed without being dried, the carbon nanotubes are easy to disperse because they do not form firm bundles as firm as those having been dried and, as a result, energy and time required for dispersion can be reduced and, therefore, the carbon nanotubes themselves tend not to be damaged during the dispersing process. Accordingly, to produce a dispersion liquid to form a material having excellent electrical conductivity, greater effects can be exhibited by dispersing carbon nanotubes having been subjected to the oxidation treatment without drying them.

The aggregate of carbon nanotubes is suitably used as a dispersion liquid obtained by dispersing the aggregate of carbon nanotubes in a dispersion medium. The dispersion liquid can be obtained by an ultrasonic dispersion treatment of an aggregate of carbon nanotubes and, if necessary, a dispersant, in a dispersion medium. As a dispersant used, a surfactant, various polymeric materials (water-soluble polymeric materials and the like) and the like can be used. The dispersant plays a role in improving dispersing ability, dispersion stabilizing ability and the like of the aggregate of carbon nanotubes or fine particles. Surfactants are classified into ionic surfactants and nonionic surfactants. Both ionic and nonionic surfactants can be used, but an ionic surfactant is preferable because of high dispersing ability. Examples of the surfactant include the following surfactants. Only one of such surfactants may be used, or a mixture of two or more kinds of them may be used.

Ionic surfactants are classified into cationic surfactants, amphoteric surfactants and anionic surfactants. Examples of the cationic surfactant include an alkyl amine salt, a quaternary ammonium salt and the like. Examples of the amphoteric surfactant include an alkylbetaine-based surfactant, an amine oxide-based surfactant and the like. Examples of the anionic surfactant include alkyl benzene sulfonates such as dodecyl benzene sulfonic acid, aromatic sulfonic acid-based surfactants such as dodecyl phenyl ether sulfonates, monosoap-based anionic surfactants, ether sulfate-based surfactants, phosphate-based surfactants, carboxylic acid-based surfactants, and the like. Among the above, in terms of excellent dispersing ability, dispersion stabilizing ability and concentrating ability, an ionic surfactant containing an aromatic ring, in other words, an aromatic ionic surfactant is preferable, and aromatic ionic surfactants such as alkyl benzene sulfonates and dodecyl phenyl ether sulfonates are especially preferable.

Examples of the nonionic surfactant include sugar ester-based surfactants such as sorbitan fatty acid esters and polyoxyethylene sorbitan fatty acid esters, fatty acid ester-based surfactants such as polyoxyethylene resin acid esters and polyoxyethylene fatty acid diethyl; ether-based surfactants such as polyoxyethylene alkyl ethers, polyoxyethylene alkyl phenyl ethers, and polyoxyethylene-polypropylene glycol; and aromatic nonionic surfactants such as polyoxyalkylene octyl phenyl ethers, polyoxyalkylene nonyl phenyl ethers, polyoxyalkyl dibutyl phenyl ethers, polyoxyalkyl styryl phenyl ethers, polyoxyalkyl benzyl phenyl ethers, polyoxyalkyl bis-phenyl ethers, and polyoxyalkyl cumyl phenyl ethers. In the above examples, "alkyl" may be an alkyl having from 1 to 20 carbon atoms. Among the above, in terms of excellent dispersing ability, dispersion stabilizing ability and concentrating ability, a polyoxyethylene phenyl ether which is an aromatic nonionic surfactant is preferable.

Examples of the various polymeric materials include water-soluble polymers such as polyvinyl alcohol, polyvinyl pyrrolidone, ammonium salts of polystyrene sulfonic acid, and sodium salts of polystyrene sulfonic acid; sugar-containing polymers such as carboxymethyl cellulose and salts thereof (a sodium salt, an ammonium salt and the like), methyl cellulose, hydroxyethyl cellulose, amylose, cycloamylose, and chitosan, and the like. In addition, conductive polymers and derivatives thereof such as polythiophene, polyethylene dioxythiophene, polyisothianaphthene, polyaniline, polypyrrole, and polyacetylene can also be used. A water-soluble polymer is preferable and, especially, the use of a water-soluble polymer such as carboxymethyl cellulose or a salt thereof (a sodium salt, an ammonium salt or the like), an ammonium salt of polystyrene sulfonic acid, or a sodium salt of polystyrene sulfonic acid is preferable because such a polymer makes the aggregate of carbon nanotubes efficiently exhibit its electrically conductive property. In addition, when a water-soluble anionic surfactant such as a sodium salt of carboxymethyl cellulose is used as a solution in an aqueous solvent, it is preferable that the pH of a dispersion liquid is adjusted to equal to or greater than 6 and equal to or less than 8. From the viewpoints of increasing the dispersing ability due to increase in electrostatic repulsion among surfactants and of maintaining the acid component in the aggregate of carbon nanotubes, a neutral pH of 7 is especially preferable. The adjustment of pH can be performed by adding an alkaline solution. Examples of the alkaline solution include a solution of ammonia or an organic amine. Preferable examples of the organic amine include nitrogen-containing organic compounds such as ethanolamine, ethylamine, n-propylamine, isopropylamine, diethylamine, triethylamine, ethylenediamine, hexamethylenediamine, hydrazine, pyridine, piperidine, and hydroxypiperidine. Among ammonia and organic amines, ammonia is the most preferable. As a solvent used to dissolve the organic amines or ammonia, water is preferably used. The pH is measured by a pH meter (manufactured by DKK-TOA CORPORATION, HM-30S).

The dispersion medium to disperse the aggregate of carbon nanotubes may be an aqueous solvent or a nonaqueous solvent. Examples of the nonaqueous solvent which may be used include hydrocarbons (toluene, xylene and the like), chlorine-containing hydrocarbons (methylene chloride, chloroform, chlorobenzene and the like), ethers (dioxane, tetrahydrofuran, methyl cellosolve and the like), ether alcohols (ethoxyethanol, methoxyethoxy ethanol and the like), esters (methyl acetate, ethyl acetate and the like), ketones (cyclohexanone, methyl ethyl ketone and the like), alcohols (ethanol, isopropanol, phenol and the like), lower carboxylic acids (acetic acid and the like), amines (triethylamine, trimethanolamine and the like), nitrogen-containing polar solvents (N,N-dimethylformamide, nitromethane, N-methylpyrrolidone and the like), sulfur compounds (dimethyl sulfoxide and the like) and the like. Among the above, as a dispersion medium, a solvent selected from water, alcohols, toluene, acetone and ethers, as well as a dispersion medium containing plural solvents selected from the above in combination are preferable. When an aqueous solvent is required, and when a binder described below is used and the binder is an inorganic polymer-based binder, a polar solvent such as water, an alcohol, or an amine is used. In addition, when a binder which is liquid at normal temperature is used as a binder, the binder itself may be used as a dispersion medium.

With regard to the amount of the dispersant added to the dispersion liquid containing the aggregate of carbon nanotubes, the mass ratio of the dispersant to the aggregate of carbon nanotubes is preferably equal to or less than 10, and more preferably from 0.8 to equal to or less than 6, and even more preferably from 0.8 to equal to or less than 3, and especially preferably from 0.8 to 2.5. When the mass ratio of the dispersant to the aggregate of carbon nanotubes is within the above-described preferable ranges, the transparent conductive film and the like obtained from such a dispersion liquid exhibit excellent properties such as excellent electrical conductivity. In addition, the more preferable amount of the dispersant to highly disperse the aggregate of carbon nanotubes varies depending on the weight-average molecular weight of the dispersant. When the dispersant is a low molecular weight compound, a relatively large amount is preferable, and when the dispersant is a high molecular weight compound, a relatively small amount is preferable. For example, when a sodium salt of carboxymethyl cellulose is used as a dispersant, the mass ratio is preferably from 0.8 to 2, more preferably from 1 to 1.5, and especially preferably from 1 to 1.3 in a dispersant having a weight-average molecular weight exceeding 300,000. On the other hand, the mass ratio is preferably from 2 to 6, more preferably from 2 to 3, and especially preferably from 2.2 to 2.8 in a dispersant having a weight-average molecular weight equal to or less than 300,000.

When the aggregate of carbon nanotubes is subjected to an ultrasonic dispersion treatment, the concentration of the aggregate of carbon nanotubes in a dispersion liquid is preferably from 0.01 mass % to 1 mass %, and more preferably from 0.01 mass % to 0.8 mass %. Herein, the concentration of the aggregate of carbon nanotubes can be calculated from the amount of each of ingredients used, but when the concentration of the aggregate of carbon nanotubes is to be measured by using the dispersion liquid of carbon nanotubes, the concentration can be calculated from the absorbance of the dispersion liquid.

The irradiation output of ultrasonic waves in the ultrasonic dispersion treatment varies depending on the amount of treatment and the dispersion time, but it is preferably from 20 to 1,000 W. To highly disperse the aggregate of carbon nanotubes without destroying the graphite structure as much as possible, it is preferable that the irradiation output, the dispersion time and the like of ultrasonic waves are adjusted. For example, when the amount of a dispersion treatment is equal to or less than 20 mL, the irradiation output of ultrasonic waves is preferably from 20 to 50 W, and when the amount of a dispersion treatment is from 100 to 500 mL, the irradiation output of ultrasonic waves is preferably from 100 W to 400 W. By adjusting the conditions e.g., shortening the dispersion time when the output of ultrasonic waves is large, and lengthening the dispersion time when the output is small, the aggregate of carbon nanotubes can be highly dispersed without destroying the graphite structure of the aggregate of carbon nanotubes as much as possible, and degradation of characteristics of the aggregate of carbon nanotubes can be prevented. Specific conditions of the treatment by ultrasonic waves are that the amount of ultrasonic irradiation calculated according to formula (1) is preferably equal to or less than 10 kW·min/g, more preferably from 0.1 kW·min/g to 4 kW·min/g, and even more preferably from 0.2 kW·min/g to 3 kW·min/g:

Amount of ultrasonic irradiation (kW·min/g)=Irradiation output (kW)×Dispersion time (min)/Dry mass of aggregate of carbon nanotubes (g)     (1).

The temperature in dispersing the aggregate of carbon nanotubes, especially in high output, is preferably set such that an increase in the liquid temperature in the dispersion treatment is prevented, for example, by conducting the dispersion treatment by a continuous flow system with cooling the liquid. The liquid temperature during the ultrasonic irradiation is preferably from 0° C. to 50° C., more preferably from 0° C. to 30° C., and even more preferably from 0° C. to 20° C. By setting the temperature in the above ranges, carbon nanotubes and a dispersant can interact with each other stably and carbon nanotubes can be highly dispersed. The frequency is preferably from 20 to 100 kHz.

After preparing such a dispersion liquid of the aggregate of carbon nanotubes, a transparent conductive film can be obtained by applying the dispersion liquid to a substrate. The method of applying the dispersion liquid of the aggregate of carbon nanotubes is not particularly limited. Any of known application methods, for example, spray coating, dip coating, spin coating, knife coating, kiss coating, gravure coating, screen printing, ink jet printing, pad printing, other types of printing, or roll coating can be utilized. In addition, application may be performed in any number of times, and two different types of application methods may be combined. The most preferable application method is roll coating.

In addition, the concentration of the aggregate of carbon nanotubes in the dispersion liquid in application of the dispersion liquid of the aggregate of carbon nanotubes is appropriately selected depending on the application method, but it is preferably from 0.001 mass % to 10 mass %.

The thickness of application (wet film thickness) of the dispersion liquid varies depending on the concentration of the application liquid, but it is preferably from 0.1 μm to 50 μm. More preferably, it is from 1 μm to 20 μm.

When an aqueous dispersion liquid of the aggregate of carbon nanotubes is applied to a substrate, a wetting agent may be added to the dispersion liquid. When the aqueous dispersion liquid is applied to a non-hydrophilic substrate, the dispersion liquid can be applied to the substrate without the dispersion liquid being repelled, in particular by adding a wetting agent such as a surfactant or an alcohol to the dispersion liquid. Preferable examples of the wetting agent include alcohols, and among alcohols, methanol or ethanol is particularly preferable. Since a lower alcohol such as methanol or ethanol is highly volatile, it can be easily removed at the time of drying the substrate after being applied. In some cases, a mixture of an alcohol and water may be used.

After applying the dispersion liquid of the aggregate of carbon nanotubes to the substrate as described above, an electrically conductive layer including the aggregate of carbon nanotubes can be obtained by removing any unnecessary dispersion medium by a method such as air drying, heating, or pressure reduction. The aggregate of carbon nanotubes thereby forms a three-dimensional network structure, and is immobilized on the substrate. Thereafter, the dispersant which is a component in the liquid is removed by using an appropriate solvent. By these operations, electric charges can be easily dispersed, and the electrical conductivity of the electrically conductive layer improves.

The solvent to remove the dispersant is not particularly limited as long as it dissolves the dispersant, and may be an aqueous solvent or a nonaqueous solvent. Specific examples of the aqueous solvent include water, alcohols, acetonitrile and the like, and examples of the nonaqueous solvent include chloroform, toluene and the like.

After forming the electrically conductive layer by applying the dispersion liquid containing the aggregate of carbon nanotubes to the substrate as described above, it is also preferable that the electrically conductive layer is overcoated with a binder material capable of forming an organic transparent coating film or an inorganic transparent coating film. The overcoating is effective to further disperse and move electric charges.

In addition, the transparent conductive film can also be obtained by a method including adding a binder material capable of forming an organic or inorganic transparent coating film into a dispersion liquid containing the aggregate of carbon nanotubes, applying the dispersion liquid to a substrate, and then, if necessary, heating the coating film such that the film is dried or baked (cured). The heating conditions in this process are appropriately set depending on the type of the binder. When the binder is photo-curable or radiation-curable, the coating film is cured by irradiation with light or radiation immediately after application instead of heat curing. As the radiation, ionizing radiation such as an electron beam, an ultraviolet ray, an X-ray, and a gamma ray can be used, and the exposure dose is determined according to the type of the binder.

The binder material is not particularly limited as long as it is used for an electrically conductive paint, and various organic and inorganic binders can be used. As the organic binder, a transparent organic polymer or a precursor thereof (hereinafter also referred to as an "organic polymer-based binder") can be used. As the inorganic binder, an inorganic polymer or a precursor thereof (hereinafter also referred to as an "inorganic polymer-based binder") can be used. The organic polymer-based binder may be any of thermoplastic, thermosetting and radiation-curable polymers.

Examples of appropriate organic binders include organic polymers such as polyolefins (polyethylene, polypropylene and the like), polyamides (nylon 6, nylon 11, nylon 66, nylon 6,10 and the like), polyesters (polyethylene terephthalate, polybutylene terephthalate and the like), silicone resins, vinyl resins (polyvinyl chloride, polyvinylidene chloride, polyacrylonitrile, polyacrylate, polystyrene derivatives, polyvinyl acetate, polyvinyl alcohol and the like), polyketones, polyimides, polycarbonates, polysulfones, polyacetals, fluororesins, phenol resins, urea resins, melamine resins, epoxy resins, polyurethane, cellulosic polymers, proteins (gelatin, casein and the like), chitin, polypeptides, polysaccharides, and polynucleotide, as well as a precursor of these polymers (a monomer or an oligomer). The transparent coating film or a matrix can be formed from the binders merely by evaporating a solvent or by heat curing the binders, or by curing the binders by light irradiation or exposure to radiation.

A preferable organic polymer-based binder is a compound having an unsaturated bond capable of being cured by radical polymerization with radiation or light, and the compound is a monomer, an oligomer or a polymer having a vinyl group or a vinylidene group. Examples of this type of monomer include styrene derivatives (styrene, methyl styrene and the like), acrylic acid, methacrylic acid or a derivative thereof (alkyl acrylate or alkyl methacrylate, allyl acrylate or allyl methacrylate and the like), vinyl acetate, acrylonitrile, itaconic acid and the like. As the oligomer or the polymer, a compound having a double bond in its main chain or a linear compound having acryloyl or methacryloyl groups at both ends is preferable. This type of radical polymerization-curable binder exhibits a high hardness and excellent rubfastness, and is capable of forming a highly transparent coating film or matrix.

Examples of the inorganic polymer-based binder include sols of metal oxides such as silica, tin oxide, aluminum oxide, and zirconium oxide, and a hydrolyzable or thermolytic organometallic compound which is a precursor of an inorganic polymer (an organophosphorus compound, an organoboron compound, an organosilane compound, an organotitanium compound, an organozirconium compound, an organolead compound, an organoalkaline earth metal compound and the like). Specific examples of the hydrolyzable or thermolytic organometallic compound include a metal alkoxide or a partial hydrolysate thereof, metal salts of lower carboxylic acids such as acetates, a metal complex with acetyl acetone and the like.

A glassy inorganic polymer-based transparent coating film or matrix composed of an oxide or a complex oxide can be formed by firing the inorganic polymer-based binder. An inorganic polymer-based matrix is generally glassy and exhibits a high hardness, excellent rubfastness and high transparency.

The amount of the binder used may be an amount sufficient to overcoat. When it is admixed in a dispersion liquid, the amount may be an amount sufficient to achieve a viscosity suitable for application. When the amount is too small, the application tends to be difficult, and when the amount is too large, the electrical conductivity tends to be impaired.

If necessary, additives such as a coupling agent, a cross-linking agent, a stabilizing agent, an anti-settling agent, a coloring agent, a charge controlling agent, and a lubricant may be admixed into the dispersion liquid. In addition, the dispersion liquid may further contain an electrically conductive organic material other than the aggregate of carbon nanotubes, an electrically conductive inorganic material, or a combination of these materials.

Examples of the electrically conductive organic material include carbon black, fullerene, a wide variety of carbon nanotubes, particles containing them, organic acids such as sulfonic acid as well as an organic compound having an acceptor structure within the molecule, such as tetracyanoquinodimethane (TCNQ), trinitrofluorenone (TNF), and chloranil.

Examples of the electrically conductive inorganic material include aluminum, antimony, beryllium, cadmium, chromium, cobalt, copper, doped metal oxides, iron, gold, lead, manganese, magnesium, mercury, metal oxides, nickel, platinum, silver, steel, titanium, zinc, and particles containing them. Preferable examples include indium tin oxide, antimony tin oxide, and a mixture thereof.

A film obtained by adding these electrically conductive materials or by overcoating the electrically conductive layer with these electrically conductive materials is very advantageous for dispersion or movement of electric charges. In addition, a layer containing an electrically conductive material other than the aggregate of carbon nanotubes and a layer containing the aggregate of carbon nanotubes may be laminated onto each other.

The material for the substrate of the transparent conductive film is not particularly limited, and examples of the material include resin, glass and the like. Examples of the resin include polyesters such as a polyethylene terephthalate (PET) and polyethylene naphthalate (PEN), polycarbonate (PC), polymethyl methacrylate (PMMA), polyimide, polyphenylene sulfide, aramid, polypropylene, polyethylene, polylactic acid, polyvinyl chloride, polymethyl methacrylate, alicyclic acrylic resins, cycloolefin resins, triacetylcellulose and the like. Examples of the glass include generally used soda glass. In addition, a plurality of substrates may be used in combination. For example, a composite substrate such as a substrate made of a combination of a resin and glass and a substrate composed of a laminate of two or more kinds of resins may be used. A substrate composed of a resin film and a hard coat formed thereon may be used. Further, films obtained by subjecting these films to a hydrophilic treatment such as a corona treatment may be used. Furthermore, films obtained by forming an undercoat layer on these films may be used. The material for the undercoat layer is preferably a highly hydrophilic material. Specifically, it is preferable to use an inorganic oxide. It is more preferable to use titania, alumina, or silica. These substances are preferable because they have a hydroxyl group which is one of hydrophilic groups on their surfaces and, therefore, they exhibit high hydrophilicity. In addition, the undercoat layer may be a resin composite with one of these inorganic oxides and, for example, a composite of fine particles of silica and a polysilicate can be mentioned.

The electrically conductive layer obtained as described above can be used while keeping the state of being adhered to the substrate, or can be used as a self-standing film by peeling it off the substrate. The self-standing film can be produced, for example, by further applying the organic polymer-based binder to the electrically conductive layer and then peeling off the substrate. In addition, after the originally produced substrate is burned off or melted by thermal decomposition, the electrically conductive layer can be used after being transferred onto another substrate. In this case, it is preferable that the thermal decomposition temperature of the originally produced substrate is lower than the thermal decomposition temperature of the substrate to which the electrically conductive layer is transferred.

The thickness of the electrically conductive layer obtained as described above may be in a wide variety of ranges. For example, the thickness of the electrically conductive layer may be between 0.5 nm and 1,000 μm. The thickness is preferably from 0.005 to 1,000 μm, more preferably from 0.05 to 500 μm, even more preferably from 1.0 to 200 μm, and especially preferably from 1.0 to 50 μm.

The total light transmittance of the transparent conductive film obtained as described above is preferably equal to or greater than 85%, and more preferably equal to or greater than 90%. In addition, the surface resistance of the transparent conductive film is preferably less than 2000Ω/□, and more preferably less than 1000Ω/□. The surface resistance is preferably equal to or greater than 1Ω/□. By setting the surface resistance in this range, the transparent conductive film can be preferably used as a substrate with a transparent electrically conductive film for a touch panel, a liquid crystal display, organic electroluminescence, electronic paper and the like. In other words, when the surface resistance is equal to or greater than 1Ω/□, the substrate as a whole can exhibit a high transmittance and can reduce power consumption. When the surface resistance is equal to or less than 1000Ω/□, an influence of an error in coordinate reading of the touch panel can be reduced.

EXAMPLES

In the following, our nanotubes and methods are described specifically by way of examples.
Evaluation of Aggregate of Carbon Nanotubes
Quantitative Determination of Acid Adsorption Amount of Aggregate of Carbon Nanotubes First, an aggregate of carbon nanotubes is suspended in ion exchanged water. The suspension is repeatedly subjected to water washing and suction filtration until the suspension becomes neutral. The thus obtained neutral suspension is filtrated to give the aggregate of carbon nanotubes in a wet state (15 mg expressed in terms of dry weight), which is weighed and fed into a 20 mL container. Ion exchanged water is added to the aggregate to make the weight of the mixture 10 g, and the mixture is subjected to ultrasonic irradiation by an ultrasonic homogenizer (manufactured by IEDA TRADING Corporation, VCX-130) with an output of 20 W for 1.5 minutes under ice cooling. The pH of the suspension of the aggregate of carbon nanotubes after having been subjected to the ultrasonic irradiation is measured, and by using the pH, the acid adsorption amount in the aggregate of carbon nanotubes is calculated according to the following formula. The acid adsorption amount (mass %) in the aggregate of carbon nanotubes is calculated by dividing the amount of the acid component (g) in the suspension of the aggregate of carbon nanotubes by the amount of the aggregate of carbon nanotubes (g) and the number of hydrogen atoms contained in one molecule of the acid component, and multiplying the obtained value by 100.

Calculating formula: Acid adsorption amount(mass %) in aggregate of carbon nanotubes=$10^{-X} \times 0.01 \times M \times 100/0.015 \times Y$ M: Molecular weight of acid component
X: pH of suspension of carbon nanotubes
Y: Number of hydrogen atoms contained in one molecule of acid component
Measurement of G/D Ratio of Aggregate of Carbon Nanotubes A powder sample was placed in a Resonance Raman spectrometer (manufactured by Horiba Jobin Yvon S.A.S., INF-300), and the measurement was performed by using a laser wavelength of 532 nm. For the measurement of the G/D ratio, three different points of the sample were analyzed and the arithmetic mean thereof was calculated.
Observation of Outside Diameter Distribution and Distribution of Number of Layers of Carbon Nanotubes To 1 mL of ethanol, 1 mg of an aggregate of carbon nanotubes was added, and the mixture was subjected to a dispersion treatment for 15 minutes by using an ultrasonic bath. A few drops of the dispersed sample were added onto a grid and dried. The thus obtained grid to which the sample was applied was placed in a transmission electron microscope (manufactured by JEOL Ltd., JEM-2100) to perform a measurement. The observation of the outside diameter distribution and the distribution of the number of layers of carbon nanotubes was conducted at a magnification of 400,000 times.
Evaluation of Transparent Conductive Film Formed by Applying Dispersion Liquid of Carbon Nanotubes to Substrate
Production of Transparent Conductive Film First, a hydrophilic silica undercoat layer on which fine particles of silica with a diameter of 30 nm are present was produced on a polyethylene terephthalate (PET) film (manufactured by Toray Industries, Inc. ("Lumirror" (registered trademark) U46)) by using a polysilicate as a binder according to the following operations.

MEGA AQUA (registered trademark) Hydrophilic DM Coat (manufactured by Ryowa corporation, DM-30-26G-N1) containing fine particles of hydrophilic silica with a diameter of 30 nm and a polysilicate in a solid concentration of 1 mass % was used as a coating liquid for producing an undercoat.

The coating liquid for producing an undercoat was applied to a polyethylene terephthalate (PET) film (manufactured by Toray Industries, Inc. ("Lumirror" (registered trademark) U46)) by using a wire bar #4. After application, the film was dried in a drying machine at 140° C. for 1 minute.

A dispersion liquid of the aggregate of carbon nanotubes having a concentration of carbon nanotubes of 0.04 mass % was prepared as described below, and this application liquid was applied by using a bar coater to the polyethylene terephthalate (PET) film (manufactured by Toray Industries, Inc. ("Lumirror" (registered trademark) U46) with a light transmittance of 91.3% and a size of 15 cm×10 cm) having the undercoat layer, the film was air-dried and, thereafter, the film was dried in a drying machine at 120° C. for 1 minute to immobilize a composition containing carbon nanotubes.

Next, Colcoat (registered trademark) (manufactured by COLCOAT CO., Ltd., N-103X) containing a polysilicate in a solid concentration of 1 mass % was used as a coating liquid for producing an overcoat. The coating liquid was applied to the layer of carbon nanotubes by using a wire bar #8 and, thereafter, the film was dried in a drying machine at 175° C. for 1 minute.

Measurement of Total Light Transmittance

The total light transmittance of the transparent conductive film was measured by placing the transparent conductive film on Haze Meter (manufactured by NIPPON DEN-SHOKU INDUSTRIES Co., LTD., NDH4000).

Measurement of Surface Resistance

The surface resistance of the transparent conductive film was measured by a four-terminal four-probe method according to JIS K 7149 (established in December, 1994) by using Loresta (registered trademark) EP MCP-T360 (manufactured by Dia Instruments Co., Ltd.). For high resistance measurement, Hiresta (registered trademark) UP MCP-HT450 (manufactured by Dia Instruments Co., Ltd., 10 V, 10 sec) was used.

Example 1

Preparation of Catalyst

In 6.2 kg of ion exchanged water was dissolved 24.6 g of ammonium ferric citrate (manufactured by Wako Pure Chemical Industries Ltd.). To this solution, 1000 g of magnesium oxide (manufactured by Iwatani Chemical Industry Co., Ltd., MJ-30) was added, and the mixture was subjected to a vigorous stirring treatment with a stirrer for 60 minutes, and the resulting suspension was introduced into a 10-L container for autoclaving. At this time, 0.5 kg of ion exchanged water was used as a washing liquid. The container was heated to 160° C. in a sealed condition and was held for 6 hours. After that, the container for autoclaving was allowed to cool, and a milky slurry substance was taken out from the container. The excess water was filtered off by suction filtration, and the filter residue dried by heating in a drying machine at 120° C. While the resulting solid content was subjected to grain refining in a mortar on a screen, catalyst bodies with grain diameters of 10 to 20 meshes were collected. The granular catalyst bodies were introduced into an electric furnace, and heated at 600° C. for 3 hours under atmospheric conditions. The bulk density of the resulting catalyst bodies was 0.32 g/mL. In addition, the filtrate which had been filtered off by the above-described suction filtration was analyzed by an Energy dispersive X-ray spectrometer (EDX), and no iron was detected. From the above, it was confirmed that the total amount of ammonium ferric citrate which had been added was supported on magnesium oxide. Further, from the results of the EDX analysis of the catalyst bodies, we found that the content of iron contained in the catalyst bodies was 0.39 wt %.

Production of Starting Material Composition Containing Carbon Nanotubes

A starting material composition containing carbon nanotubes was synthesized by using the above-described catalyst. First, 132 g of the above-described solid catalyst was taken and a layer of the catalyst was formed by introducing the catalyst on a quartz sintered plate placed at the center part of a reactor installed in the vertical direction. While the layer of the catalyst bodies was heated until the temperature within the reactor reached 860° C., nitrogen gas was supplied from the bottom side of the reactor toward the upper side of the reactor at a rate of 16.5 L/min, and nitrogen gas was made to flow such that the nitrogen gas passed the layer of the catalyst bodies. Thereafter, while nitrogen gas was supplied, methane gas was further introduced at a rate of 0.78 L/min for 60 minutes and was made to flow such that the methane gas passed the layer of the catalyst bodies to cause a reaction. The introduction of methane gas was stopped, and while nitrogen gas was ventilated at a rate of 16.5 L/min, the reactor of quartz tube was cooled to room temperature to give an aggregate of carbon nanotubes attached with the catalyst. In 2000 mL of a 4.8N aqueous solution of hydrochloric acid, 129 g of the aggregate of carbon nanotubes attached with the catalyst was stirred for 1 hour to dissolve iron which was a catalytic metal and MgO which was a support therefor. The resulting black suspension was filtrated and, thereafter, the filter residue was added into 400 mL of a 4.8N aqueous solution of hydrochloric acid again to remove MgO. Then, MgO was collected by filtration. This operation was repeated three times, and the starting material composition containing carbon nanotubes from which the attached catalyst had been removed was obtained.

Primary Oxidation Treatment Step

The starting material composition containing carbon nanotubes was added to concentrated nitric acid (manufactured by Wako Pure Chemical Industries Ltd., 1st Grade Assay, 60 mass %) of 300 times of weight based on the starting material composition. Thereafter, the mixture was heated to reflux with stirring in an oil bath at 140° C. for 24 hours. After being heated to reflux, the nitric acid solution containing the composition containing carbon nanotubes was diluted with ion exchanged water twice and subjected to suction filtration. The filter residue was washed with ion exchanged water until the suspension of the filter residue became neutral, to give a primary treated aggregate of carbon nanotubes. The primary treated aggregate of carbon nanotubes was stored as it was in a wet state containing water.

Secondary Oxidation Treatment Step

The primary treated aggregate of carbon nanotubes obtained in the primary oxidation treatment step was added to fuming nitric acid (manufactured by Wako Pure Chemical Industries Ltd., 1st Grade Assay, 97 mass %) of 300 times of weight based on the primary treated aggregate. Thereafter, the mixture was heated with stirring at 60° C. for 6 hours. After being heated, the solution of nitric acid containing the aggregate of carbon nanotubes was diluted with ion exchanged water twice and subjected to suction filtration. The filter residue was washed with ion exchanged water until the suspension of the filter residue became neutral to give a secondary treated aggregate of carbon nanotubes. The secondary treated aggregate of carbon nanotubes was stored as it was in a wet state containing water. The acid adsorption amount of the aggregate of carbon nanotubes was 0.9 mass %, and the Raman G/D ratio was 54. In addition, the secondary treated aggregate of carbon nanotubes was observed with a high-resolution transmission electron microscope, and the mean outside diameter of carbon nanotubes was 1.7 nm. Further, the ratio of the double-walled carbon nanotubes to the total carbon nanotubes was 82%.

Evaluation of Properties of Transparent Conductive Film

The secondary treated aggregate of carbon nanotubes in a wet state (15 mg expressed in terms of dry weight) and 0.38 g of a 10 mass % aqueous solution of carboxymethyl cellulose sodium (weight-average molecular weight: 35,000) were weighed and fed into a 20 mL container, ion exchanged water was added such that the total weight became 10 g, and the pH was adjusted to 7 by using a 28% aqueous solution of ammonia (manufactured by Kishida Chemical Co. Ltd.). The resulting liquid was subjected to a dispersion treatment by using an ultrasonic homogenizer (manufactured by IEDA TRADING Corporation, VCX-130) with an output of 20 W for 1.5 minutes (2 kW·min/g) under ice cooling.

Water was added to the thus obtained dispersion liquid and the concentration of the aggregate of carbon nanotubes was adjusted to 0.04 mass % as a final concentration to give an application liquid for film. Then, the application liquid was applied to a polyethylene terephthalate (PET) film (manufactured by Toray Industries, Inc. ("Lumirror" (registered trademark) U46) with a light transmittance of 91.3% and a size of 15 cm×10 cm) having an undercoat layer formed as described above by using a bar coater, the film was air-dried and, thereafter, the film was dried in a drying machine at 140° C. for 1 minute to immobilize a composition containing carbon nanotubes. After that, we found that the conductive film obtained by forming the overcoat layer on the layer of carbon nanotubes as described above had a surface resistance of 200Ω/□ and a total light transmittance of 90%.

Comparative Example 1

The aggregate of carbon nanotubes was synthesized and subjected to an oxidation treatment in the same manner as in Example 1 except that the secondary oxidation treatment step was not performed and, as a result, the thus obtained aggregate of carbon nanotubes had an acid adsorption amount of 0.5 mass % and a Raman G/D ratio of 38. In addition, the aggregate of carbon nanotubes was observed with a high-resolution transmission electron microscope, and we found that the mean outside diameter of carbon nanotubes was 1.7 nm. Further, we found that the ratio of the double-walled carbon nanotubes to the total carbon nanotubes was 90%.

After that, properties of the conductive film were evaluated in the same manner as in Example 1 and, as a result, we found that the film had a surface resistance of 260Ω/□ and a total light transmittance of 90%.

Example 2

The aggregate of carbon nanotubes was synthesized and subjected to an oxidation treatment in the same manner as in Example 1 except that the oxidation treatment time of the secondary oxidation treatment step was 24 hours and, as a result, the thus obtained aggregate of carbon nanotubes had an acid adsorption amount of 1.1 mass % and a Raman G/D ratio of 87. In addition, the aggregate of carbon nanotubes was observed with a high-resolution transmission electron microscope, and we found that the mean outside diameter of carbon nanotubes was 1.7 nm. Further, we found that the ratio of the double-walled carbon nanotubes to the total carbon nanotubes was 71%.

After that, properties of the conductive film were evaluated in the same manner as in Example 1, and we found that the film had a surface resistance of 185Ω/□ and a total light transmittance of 90%.

Comparative Example 2

The aggregate of carbon nanotubes was synthesized and subjected to an oxidation treatment in the same manner as in Example 1 except that the secondary oxidation treatment step was performed under the same conditions as those of the primary oxidation treatment step. In other words, 60% nitric acid was employed and the mixture was heated to reflux with stirring in an oil bath at 140° C. for 24 hours in the secondary oxidation treatment step. As a result, we found that the thus obtained aggregate of carbon nanotubes had an acid adsorption amount of 0.5 mass % and a Raman G/D ratio of 63. In addition, the aggregate of carbon nanotubes was observed with a high-resolution transmission electron microscope, and we found that the carbon nanotubes had a mean outside diameter of 1.7 nm. Further, we found that the ratio of the double-walled carbon nanotubes to the total carbon nanotubes was 90%.

Properties of the conductive film were evaluated in the same manner as in Example 1, and we found that the film had a surface resistance of 240Ω/□ and a total light transmittance of 90%.

The conditions of the primary oxidation treatment step and those of the secondary oxidation treatment step as well as the evaluation results of the obtained aggregates of carbon nanotubes and the transparent conductive films of Examples 1 and 2 as well as Comparative Examples 1 and 2 are shown in Table 1.

TABLE 1

| | | Example 1 | Example 2 | Comparative Example 1 | Comparative Example 2 |
|---|---|---|---|---|---|
| Primary oxidation treatment step | Oxidizing agent | 60% Nitric acid | 60% Nitric acid | 60% Nitric acid | 60% Nitric acid |
| | Temperature (° C.) | 140 | 140 | 140 | 140 |
| | Time (hr) | 24 | 24 | 24 | 24 |
| Secondary oxidation treatment step | Oxidizing agent | 97% Nitric acid | 97% Nitric acid | — | 60% Nitric acid |
| | Temperature (° C.) | 60 | 60 | — | 140 |
| | Time (hr) | 6 | 24 | — | 24 |
| Properties of aggregate of carbon nanotubes | Acid adsorption amount (mass %) | 0.9 | 1.1 | 0.5 | 0.5 |
| | Raman G/D ratio | 54 | 87 | 38 | 63 |
| | Mean outside diameter (nm) | 1.7 | 1.7 | 1.7 | 1.7 |
| | Ratio of double-walled CNT (%) | 82 | 71 | 90 | 90 |

TABLE 1-continued

| | | Example 1 | Example 2 | Comparative Example 1 | Comparative Example 2 |
|---|---|---|---|---|---|
| Properties of transparent conductive film | Surface resistance (Ω/□) | 200 | 185 | 260 | 240 |
| | Total light transmittance (%) | 90 | 90 | 90 | 90 |

By comparing Examples 1 and 2 as well as Comparative Examples 1 and 2, we found that the acid adsorption amount increases by performing a secondary oxidation treatment step which is an oxidation treatment conducted under a stronger oxidizing condition than a primary oxidation treatment step. In addition, by comparing Examples 1 and 2 as well as Comparative Examples 1 and 2, we found that the transparent conductive films obtained by using the aggregates of carbon nanotubes of Examples 1 and 2 have excellent electrical conductivity while keeping a high total light transmittance.

INDUSTRIAL APPLICABILITY

A transparent conductive film exhibiting high electrical conductivity and excellent transmittance can be obtained by using the aggregate of carbon nanotubes. The obtained transparent conductive film can be used as a transparent electrode of a display-related material for which high surface smoothness is mainly required, such as a touch panel, a liquid crystal display, organic electroluminescence, and electronic paper.

The invention claimed is:

1. An aggregate of carbon nanotubes, the aggregate having an acid adsorption amount equal to or greater than 0.6 mass % and equal to or less than 12 mass % of an acid component adsorbed to carbon nanotubes contained in the aggregate represented by a mass fraction of the acid component to a total amount of the aggregate, wherein the acid adsorbed is nitric acid, a ratio (G/D ratio) of a height of G band to that of D band in Raman spectroscopic analysis at 532 nm wavelength of the aggregate of carbon nanotubes is equal to or greater than 30.

2. The aggregate according to claim 1, wherein the mean outside diameter of carbon nanotubes contained in the aggregate of carbon nanotubes is equal to or greater than 1 nm and equal to or less than 3 nm.

3. The aggregate according to claim 1, wherein a ratio of content of double-walled carbon nanotubes to a total content of carbon nanotubes in the aggregate of carbon nanotubes is equal to or greater than 50%.

4. A dispersion liquid comprising the aggregate of carbon nanotubes according to claim 1 and a dispersion medium.

5. A transparent conductive film comprising a substrate, and an electrically conductive layer comprising the aggregate of carbon nanotubes according to claim 1 formed on the substrate.

6. The transparent conductive film according to claim 5, which has a total light transmittance equal to or greater than 90% and a surface resistance equal to or less than 1000 Ω/□.

7. A method of producing an aggregate of carbon nanotubes according to claim 1 comprising:
a primary oxidation treatment step, wherein a starting material composition containing carbon nanotubes is subjected to a wet oxidation treatment to give a primary treated aggregate of carbon nanotubes having a ratio (G/D ratio) of the height of G band to that of D band in Raman spectroscopic analysis at 532 nm wavelength equal to or greater than 30; and
a secondary oxidation treatment step of performing a wet oxidation treatment under an oxidizing condition stronger than that of the primary oxidation treatment step.

8. The method according to claim 7, wherein a ratio (G/D ratio) of a height of G band to that of D band in Raman spectroscopic analysis at 532 nm wavelength of the aggregate of carbon nanotubes after the secondary oxidation treatment step is equal to or greater than 30.

9. The method according to claim 8, wherein the ratio of the content of double-walled carbon nanotubes to the total content of carbon nanotubes contained in the aggregate of carbon nanotubes after the secondary oxidation treatment step is equal to or greater than 50%.

10. The method according to claim 8, wherein the mean outside diameter of carbon nanotubes contained in the aggregate of carbon nanotubes after the secondary oxidation treatment step is equal to or greater than 1 nm and equal to or less than 3 nm.

11. The method according to claim 7, wherein the ratio of the content of double-walled carbon nanotubes to the total content of carbon nanotubes contained in the aggregate of carbon nanotubes after the secondary oxidation treatment step is equal to or greater than 50%.

12. The method according to claim 11, wherein the mean outside diameter of carbon nanotubes contained in the aggregate of carbon nanotubes after the secondary oxidation treatment step is equal to or greater than 1 nm and equal to or less than 3 nm.

13. The method according to claim 7, wherein the mean outside diameter of carbon nanotubes contained in the aggregate of carbon nanotubes after the secondary oxidation treatment step is equal to or greater than 1 nm and equal to or less than 3 nm.

14. The method according to claim 7, wherein the primary oxidation treatment step is a heat treatment step in nitric acid.

15. The method according to claim 14, wherein the secondary oxidation treatment step is a treatment step using a higher concentration of nitric acid than a concentration of nitric acid used in the primary oxidation treatment step.

16. An aggregate of carbon nanotubes, the aggregate having an acid adsorption amount equal to or greater than 0.6 mass % and equal to or less than 12 mass % of an acid component adsorbed to carbon nanotubes contained in the aggregate represented by a mass fraction of the acid component to a total amount of the aggregate, wherein the acid adsorbed is nitric acid, and a ratio of content of double-walled carbon nanotubes to a total content of carbon nanotubes in the aggregate of carbon nanotubes is equal to or greater than 50%.

\* \* \* \* \*